US 6,695,387 B1

(12) United States Patent  
Gordon

(10) Patent No.: US 6,695,387 B1
(45) Date of Patent: Feb. 24, 2004

(54) ADJUSTABLE, APPENDANT VEHICLE DOOR PANEL ARMREST

(76) Inventor: Stephen Gordon, 8020 Needwood Rd., Apt. 103, Derwood, MD (US) 20855

( * ) Notice: Subject to any disclaimer, the term of this patent is extended or adjusted under 35 U.S.C. 154(b) by 0 days.

(21) Appl. No.: 10/356,021

(22) Filed: Feb. 3, 2003

(51) Int. Cl.⁷ .................................................. B60J 9/00
(52) U.S. Cl. ................................. 296/153; 297/411.21
(58) Field of Search ....................... 296/153; 297/411.21

(56) References Cited

U.S. PATENT DOCUMENTS

| | | | | |
|---|---|---|---|---|
| 2,633,186 A | * | 3/1953 | Jeckell | 297/227 |
| 5,332,288 A | * | 7/1994 | Coates | 297/411.21 |
| 5,692,711 A | * | 12/1997 | Tucker | 248/118 |
| 5,951,094 A | * | 9/1999 | Konishi et al. | 296/153 |

* cited by examiner

*Primary Examiner*—Joseph D. Pape

(57) ABSTRACT

An appendant to existing vehicle door panel armrests that renders the arm support location more adjustable and the arm more comfortable. The device generally contains three components: a cushion, a base plate, and one or more projections of various sizes. The projections may be installed in various configurations by the end-user for use with many makes and models of vehicles. The appendant can be stably placed to rest on the existing armrest top surface with the projections inserted into the existing door-pull opening or cavity. The present invention may be easily installed or removed with no permanent alteration of the existing door panel or exiting armrest. Several adjustable features permit adjustments for height, forward/rearward/sidewise position, and up/down tilt.

8 Claims, 5 Drawing Sheets

ADJUSTABLE, APPENDANT VEHICLE DOOR PANEL ARMREST

BACKGROUND OF INVENTION

The present invention is an appendant to existing vehicular armrests such as are fixed to the interior of most vehicular door side panels. Specifically, the invention relates to modifying the fixed door-pull armrest for enhanced adjustability and comfort. In practice it is adapted to allow use of this armrest modification with a wide variety of styles and configurations of interior side panel armrests such as exist in many makes and models of land, sea, air or space vehicles.

Standard armrests, which are fixed to vehicle side door panels, do not allow most drivers/passengers to rest their arm comfortably on the existing door-pull, while continuing to hold the steering wheel safely, resulting over time in strain to drivers' shoulders while operating the vehicle. In fact, many physical therapists recommend to patients experiencing upper extremity pain that they place a rolled-up towel on the existing armrest to raise it's height for more comfort. Whereas this invention provides greater comfort as a purpose herein, it likewise ensures availability of adjustments for height, forward/rearward/sidewise position, and up/down tilt in a device that can be mounted simply and reversibly to most vehicles. The device may thus be used to accommodate drivers and passengers of variable anatomical size, weight or conformation.

Various efforts have been made to accommodate the armrest needs of vehicle drivers and passengers. For example, in U.S. Pat. No. 1,247,547 (Ko Euno) a soft cushion is provided as a clamp-on device for wooden armrests. Several covers for existing vehicle armrests are described in U.S. Pat. No. 2,633,186 (Jeckell), U.S. Pat. No. 2,703,602 (Greenstadt), and U.S. Pat. No. 2,721,605 (Griffiths, et al.); however, these devices are all intended to protect the armrest from wear or damage and do not accommodate the occupant in a meaningful manner. The current invention is a supplement to existing vehicle door panel armrests, and not a replacement for them.

THE PRIOR ART

U.S. Pat. No. 4,982,921 (Sanders) provides for a second armrest that can be placed on the open window frame of a vehicle. A similar device, defined in U.S. Pat. No. 5,893,601 (Carlber), describes a clip device to attach a fixed second armrest to the doorframe of a vehicle. U.S. Pat. No. 5,964,497 (Wiles) improves on this concept by allowing for sliding and plural pivot point adjustments for a second armrest. By contrast, the current invention does not comprise a second, independent armrest, per se.

One earlier patented supplemental armrest was provided in U.S. Pat. No. 5,332,288 (Coates). Significantly, it defines a thin cushioning that may be attached to an existing vehicle door panel, setting on the existing armrest with a degree of forward and rearward adjustment. Notwithstanding, this attachment to the door panel requires affixing an anchor to the door panel per se, thereby holding the new arm cushion in position by Velcro® or other means. This patent suggests a pad thickness of one-half to one inch with a clear recommendation that thicker pads would be uncomfortable. To the contrary, the adjustable vehicle door panel armrest of the present invention requires no alteration to the exiting vehicle panel, it being attached via insertion of one or more projections into the existing armrest cavity. It also allows for adjustable armrest thickness, substantially greater than one inch, provides for various configurations to fit a wider range of diverse vehicles, and has greater overall adjustability in comparison to that provided by Coates, aforesaid.

BRIEF SUMMARY OF THE INVENTION

The present invention is an appendant to existing vehicle door panel armrests whereby the disposition of the arm support is created selectively more adjustable, thereby enhancing the comfort of the drivers' arm. In its preferred embodiment, the assembly of invention defines variable anchoring projections, for selective utility with conventional vehicles, whereby the assembly sets on the existing armrest top surface, one or more projections being inserted into the door-pull opening of the armrest. The projections provide a tight fit or triangulation anchorage for the appendant vehicle door panel armrest. The invention may be easily installed or removed with no permanent alteration to the existing door panel or exiting armrest. A cushion segment of the supplemental armrest comprises a comfortable, resilient material covered with an appropriate, durable material. Coactive with the existing panel armrests, anchor elements of the appendant permit adjustments for height, forward/rearward/sidewise position, and up/down tilt.

One object of the invention is to provide an appendant to an extant door-pull and armrest, ensuring greater user comfort and facile insertions and/or removal from an existing vehicle door panel armrest.

Another object of the invention is to provide an appendant to an extant armrest that contains a built-in variety of locations for projections of various sizes and lengths thereby allowing mounting of the device with differing makes and models of vehicles.

Another object of the invention is to provide an appendant armrest that incorporates numerous built-in and/or readily available means for adjustments of height, forward/rearward/sidewise position, and up/down tilt.

These and further objects and advantages of the invention will be readily understood as the following description is read in conjunction with the accompanying drawings, wherein like reference numerals have been used to designate like elements throughout the several views.

DESCRIPTION OF PREFERRED EMBODIMENTS

The features and advantages of the present invention will become more clearly appreciated from the following description taken in conjunction with the accompanying drawings in which:

FIG. 2 is a series of schematic views of one embodiment of the armrest appendant, wherein

DETAILED DESCRIPTION OF THE INVENTION

Whereas a detailed embodiment of the present invention is disclosed herein, it should be understood that the following description and drawings are merely exemplary of the invention, which may be manufactured and or used in various configurations without departing from the scope of the claims. Therefore, the details disclosed herein are not to be interpreted as limited, but merely as the basis for the claims and as a basis for teaching one skilled in the art how to make and/or use the claimed invention.

The adjustable, door panel appendant armrest is mounted for unique stabilization and sequentially removal from a wide variety of existing vehicle armrests and door-pull openings. This appendant can effectively raise the armrest height, be moved forward/rearward/sidewise, and tilted up or down. The firmness of the composite unit and its covering material make the armrest more comfortable for the user. As will be apparent, the primary function of the appendant is its utility combination with vehicle (car, truck, etc.) outboard armrests that commonly define a door-pull opening or cavity to serve in addition as a door handle.

Figure 1:
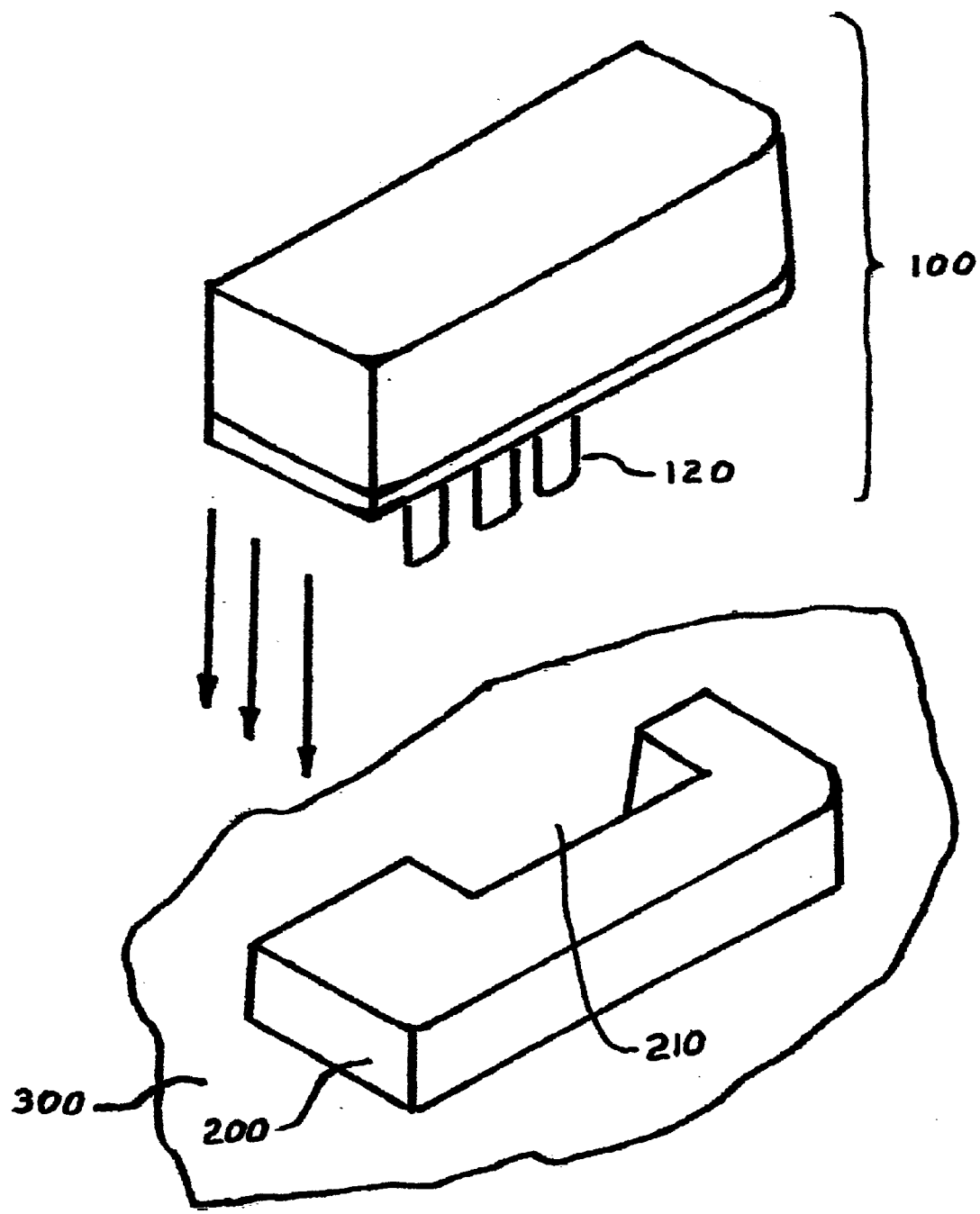
FIG. 1 is a schematic perspective view of one embodiment of the appendant door panel armrest and its relationship to a conventional car door panel and armrest, the latter being phantom lined.

FIG. 1 shows the assembled adjustable, door panel armrest appendant 100 as it would be supported by a conventional vehicle armrest 200 having a door-pull opening 210, the element 200 being permanently attached to the door panel 300 in prior art. The appendant 100 is intended to be installed with stability, yet readily removed. Likewise, when assembled, the adjustable, door panel armrest appendant 100 rests on the existing armrest 200 and is restrained from displacement by one or more support pegs 120 that insert into the existing door-pull cavity 210.

Figures 2A, 2B:
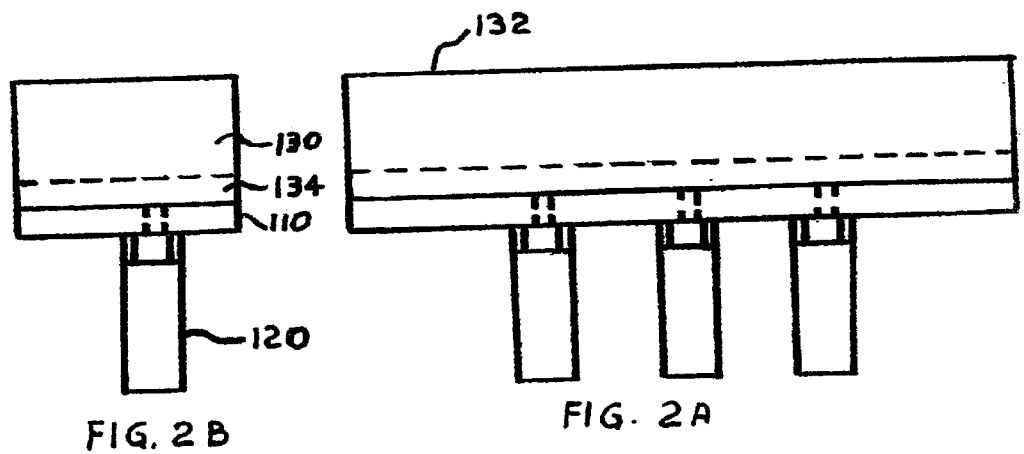
FIG. 2A is a vertical side view.
FIG. 2B is an end view thereof and FIG. 2C is a bottom plan view thereof.
Figure 2C:
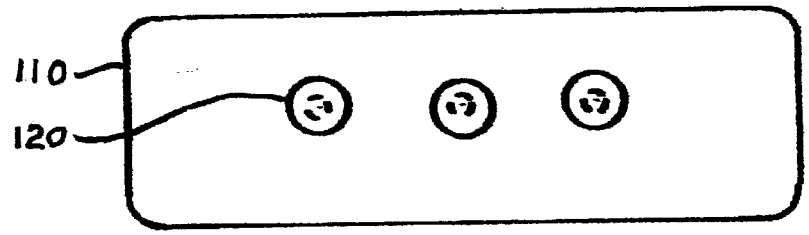

Referring to FIGS. 2A, 2B and 2C, a preferred embodiment, the appendant consists of three main components: a base plate 110 and support pegs 120 and cushion 130. The cushion includes primarily rectangular block of cushioning material, such as foam rubber suitably upholstered with a durable and flexible cover 132. Preferred covering materials include cloth, vinyl, or leather. The cushion may be supplied in a variety of colors, materials, heights, firmnesses, and sizes to fit the supporting vehicle armrest, the vehicle interior color and user comfort. In one preferred embodiment, the color would be a neutral tan; the material would be a heavy, durable cloth; in a preferred form the dimensions of the cushion will be 12 inches long by 4 inches wide by 3 inches high, and the selected resilient material therein would be moderately firm. See FIGS. 2A and 2B.

In one embodiment, the cover 132 may be form fitted as by heat sealing or wrapped around the cushioning material and secured thereto by appropriate gluing, stitching, stapling or other fastening means. Depending upon the porosity of the cover, appropriate vents in the cover, not shown, may be desirable. A cushion backing 134 consisting of plastic, wood, or metal, may facilitate attachment of cushion 130 to base plate 110. Alternatively, the cover 132 may be bonded or glued directly to the cushion, which is in turn bonded or glued to the base plate to provide secure attachment. In either case, the cushion 130 is firmly attached to base plate 110 by means such as screwing, nailing, gluing, bonding or stapling.

Figure 3:
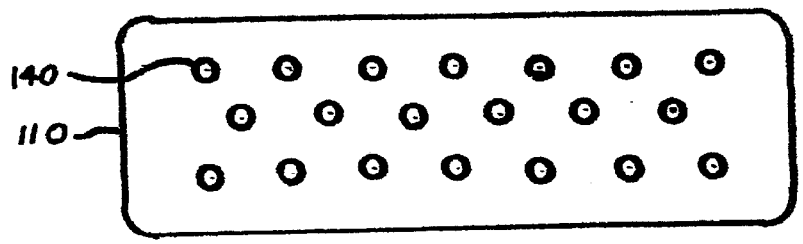
FIG. 3 is a bottom plan schematic view of the base plate of the appendant door panel armrest herein.

The base plate 110 serves three functions. It supports cushion 130, rests on and transfers the arm weight to the fixed vehicle armrest 200, and anchors the support pegs 120. The preferred material of the base plate 110 is plastic; however, other embodiments may include wood or metal. Its upper surface may be stitched, glued, bonded, stapled or screw fastened to the cushion 130. In selected embodiments, the cushion covering may wrap around both cushion 130 and base plate 110 to be fastened by gluing or stapling of the covering material to the bottom of the base plate. As indicated in FIG. 1, the base plate's bottom surface rests on the existing vehicle armrest 200 thereby transferring the weight of the user's arm. FIG. 3 shows the bottom surface of the base plate 110 that defines multiple threaded female apertures which secure support pegs 120. These three support pegs 120 are shown screwed into the bottom of the base plate. Alternatively, any practical number of support pegs may be attached to ensure stability. Threaded apertures may be drilled and tapped directly into the base material. Additionally, the female threaded apertures may comprise metal nuts, not shown, which are firmly embedded into the base plate during the molding and/or formation process.

FIG. 3, a bottom plan view of base plate 110, depicts an effective pattern of threaded apertures 140 wherein their horizontal cross-section is sufficient to retain the lower extension of support pegs yielding alternative choices as to the location of the support pegs 120. Clearly, the end-user may select the number and location of apertures in the base plate into which the support pegs are screwed. An aperture pattern is desired that allows appendant armrest pegs to be compressibly inserted into the door-pull cavity 210 on varying models of known combination armrests and door pulls. The projections provide a tight fit or triangulation anchorage for the appendant vehicle door panel armrest 100. Useful alternatives to the above-defined female/male threaded attachment include friction/snug fit and snap together female/male components, for example, as used in air pressure fittings.

Figure 4:
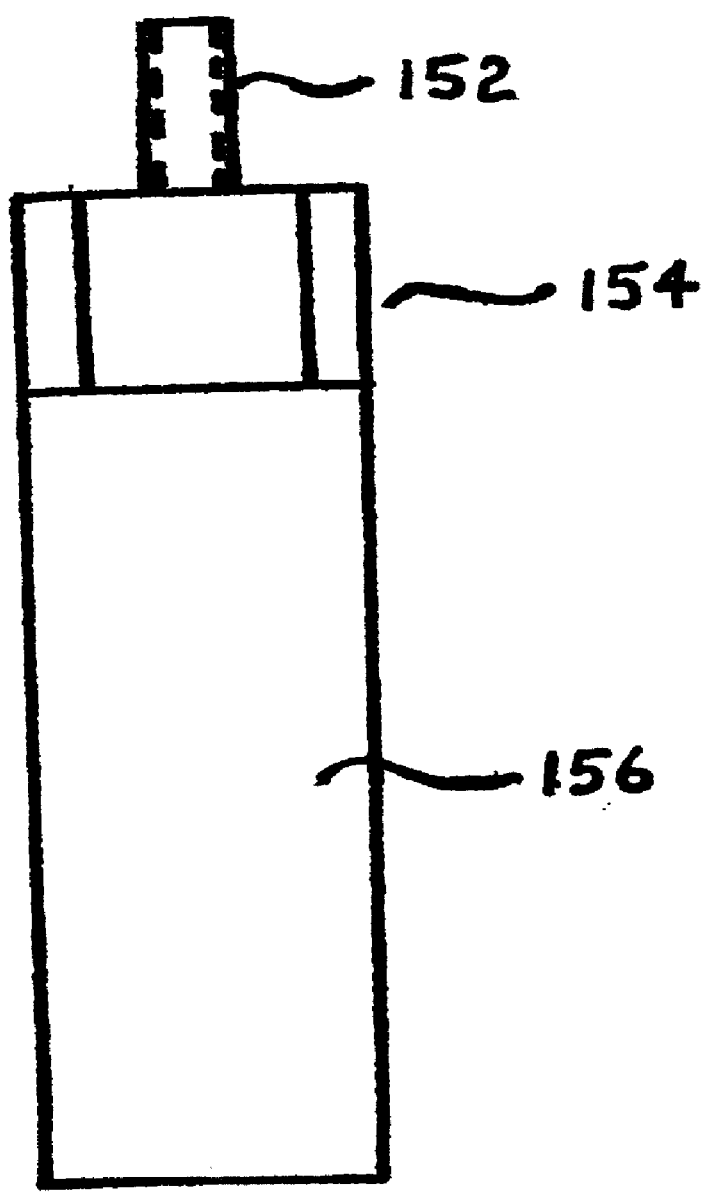
FIG. 4 is a front plan view of one support peg component of the adjustable appendant door panel armrest of FIGS. 1, 2 or 3.

FIG. 4 depicts an enlarged side view of support peg 120. When the present composite appendant is assembled, its support pegs are inserted into the door-pull cavity or opening of the existing armrest to prevent the appendant armrest from falling off or sliding. Parenthetically, the preferred material of the support pegs is plastic, alternative materials being metal or wood. A male threaded extension 152 extends from the top of the support peg, the same having a diameter and thread count to match the female threaded aperture on the base plate. In one such preferred embodiment, the male threaded extension comprises a ¼ metal bolt, molded into the peg during the formation process; the threaded portion thereof extending ¼ inch above the peg. It is anticipated that the threaded male part will be sufficiently long to permit emplacement of two complete threads thereof into the corresponding female threaded aperture. As indicated above, friction fit or snap fit will suffice. In the configuration shown, there is a hexagonal segment 154 at the top of the support peg 120 for engagement with a standard wrench when tightening to the base plate. Other means such as apertures, slots, or roughened surface may be embossed to facilitate tightening. Support pegs 120 maybe of any general size and shape to practically fit into the existing door-pull opening in the vehicle armrest. For example, the lower shaft segment 156 of the support peg has a cylindrical exterior diameter of 0.75 inches and a length of 3 inches. Alternative configurations include square, hexagonal, or oval, provided the length is sufficient to engage a major substantial vertical portion of the corresponding door-pull opening 210. This appendant may be supplied to end-users in several available lengths of support pegs, ensuring a high degree of flexibility in adapting the adjustable, appendant door panel armrest to many different makes and models of vehicles.

Figure 5:
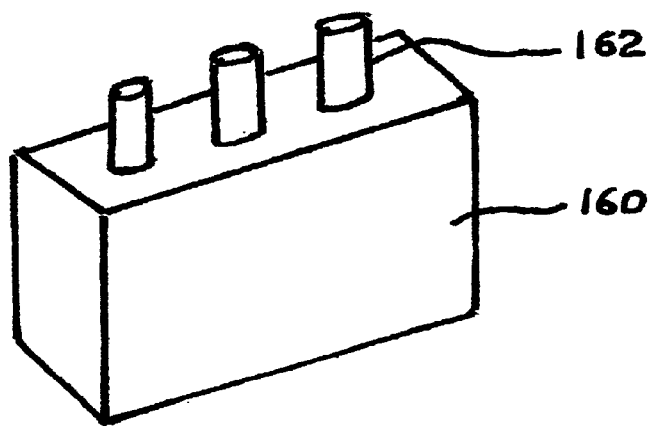
FIG. 5 is an enlarged perspective view of an alternative support peg component of the appendant armrest herein.

FIG. 5 shows. modification in which a solid rectangular plug 160 may be retained in place of the two or more support pegs, reference FIG. 1. In lieu of male threaded extension segments 152 on the pegs, reference FIG. 4, there may be two or more friction fit or snap fit extension segments 162 of the appropriate diameter and length to attach to the base plate. These extension segments would fit securely into corresponding base plate apertures. This solid rectangular piece thus serves the same purpose of preventing the adjustable door-panel appendant from falling off or slipping.

In another embodiment, pegs may be used to provide a leveling of the adjustable, appendant door panel armrest as well keep it from falling or sliding. In this variation, one or more shorter support pegs can be screwed into the base plate 110 and rest on the door-pull armrest 200 top surface so that the device may be tilted up or down, relative to a horizontal axis. Alternatively, two or more shorter support pegs may be inserted into the base plate and rest on the door-pull armrest top surface to raise the device, permitting by adjustability more comfort to the user. It is anticipated that longer support pegs will still be used in these examples to keep the device from falling or slipping. The hole pattern of the base plate 110 allows the end-user to adjust the appendant 100 forward/ rearward/ sidewise by selecting from several alternative placement patterns for the support pegs 120 or rectangular plugs 160 that will provide stability of the appendant in several locations relative to the door-pull armrest 200.

Figure 6:
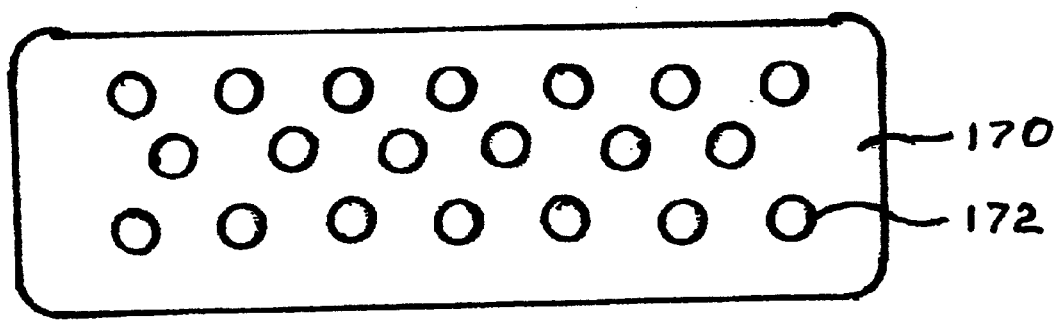
FIG. 6 is a schematic bottom plan view of an appendant height adjustment spacer plate of the appendant armrest herein.
Figure 7:
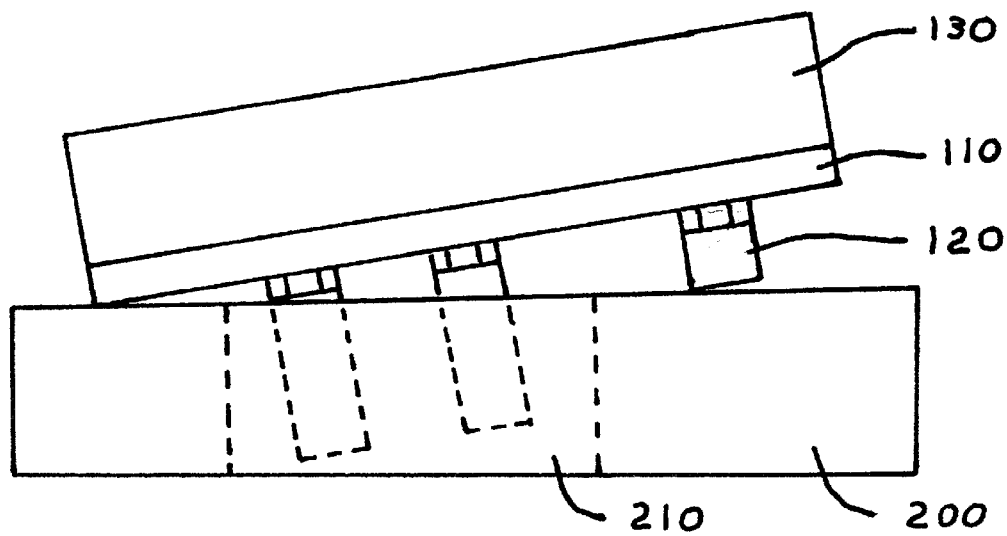
Figure 8:
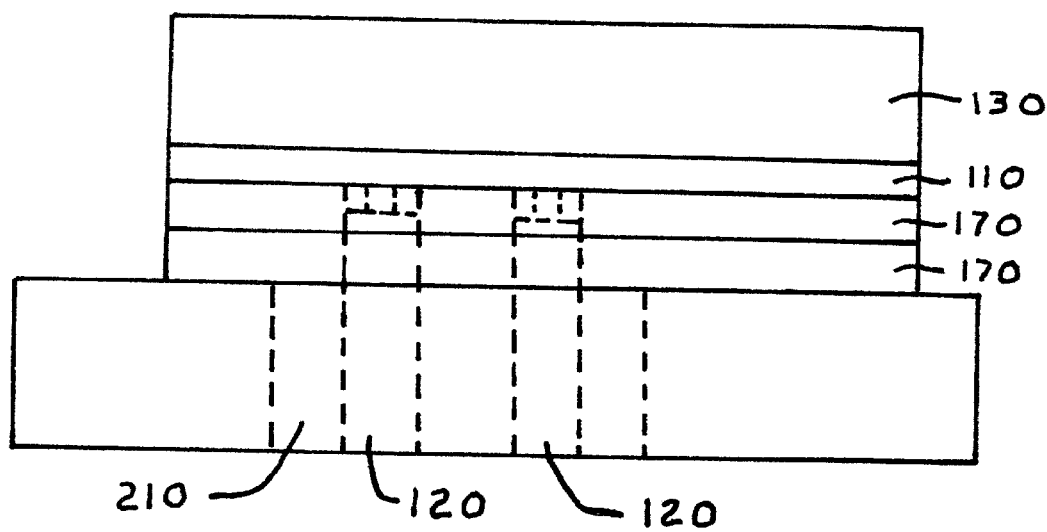

FIG. 6 shows schematically a height adjustment spacer plate 170 that may be used to uniformly raise the adjustable, appendant door panel armrest. The height adjustment plate has clearance apertures with the same centerlines as on the base plate, but the clearance holes 172 are of a diameter greater than the support pegs. This would allow the height adjustment plate to be placed between the base plate and the vehicle armrest no matter how many support pegs have been screwed in place. The height adjusting spacer plate 170 may be available in several appropriate thicknesses, for example, 0.5, 0.75 and 1.0 inches. When using one or more height adjustment plates, the end-user may thus select a longer support peg to accommodate the additional thicknesses of the height adjustment spacer plate(s) 170, ensuring stable fixation into the door-pull opening 210.

What is claimed is:

1. A vehicular arm rest appendant for passenger and/or driver utility, said arm rest appendant being adapted to be used with an existing interior door pull and arm rest arrangement of a vehicle of the type having a hand engagement channel, comprising:
   a rigid base plate having spaced apart, downwardly extending support peg apertures and support pegs that are received in the support peg apertures, the support pegs extending downwardly from the base plate to engage the hand engagement channel of the door pull, whereby the base plate is positioned on top of the existing arm rest; and
   a cushion supported by the base plate and extending upwardly therefrom to form an arm rest support surface of greater height than the existing arm rest support surface.

2. The arm rest appendant of claim 1 wherein:
   the cushion extending along the existing arm rest from front to rear, being formed of resilient foam, having a flexible, durable covering and being retained securely to the base plate.

3. The arm rest appendant of claim 1 wherein:
   the base plate is constructed of a rigid material, and the support peg apertures may selectively include support pegs or not to permit adjustment of the appendant support peg arrangement to match a variety of different sized and shaped hand engagement channels so as to result in a tight fit of the support pegs within the hand engagement channel.

4. The arm rest appendant of claim 1 wherein:
   the support pegs are constructed of a rigid material and further comprising means for securing the pegs to the base plate by insertion thereof into the support peg apertures.

5. The arm rest appendant of claim 1 wherein:
   the support peg apertures are arranged in an array and the arrayed support peg apertures may selectively include support pegs or not to permit adjustment of the appendant support peg arrangement in order to position the appendant in a plurality of locations forwardly, rearwardly and laterally with respect to the existing arm rest so as to result in a tight fit of the support pegs within the hand engagement channel and to customize the position of the appendant for a given user.

6. The arm rest appendant of claim 1 wherein:
   the support peg apertures are arranged in an array and the support pegs include long and short support pegs; whereby some of the arrayed support peg apertures have long support pegs received therein which engage the hand engagement channel and other arrayed support peg apertures have short support pegs therein which engage the existing arm rest support surface so as to result in a tilted arm rest support surface provided by the cushion.

7. The arm rest appendant of claim 1 further comprising one or more height adjustment spacer plates interposed between the base plate of the appendant and the existing arm rest for height adjustment of the arm rest support surface provided by the cushion and second support pegs, which are longer than the support pegs used without the one or more height adjustment spacer plates, are used to engage the existing hand engagement channel.

8. The arm rest appendant of claim 7 wherein:
   the one or more height adjustment spacer plates are constructed of variant thicknesses.

* * * * *